(12) United States Patent
Chenelle et al.

(10) Patent No.: US 10,428,716 B2
(45) Date of Patent: Oct. 1, 2019

(54) HIGH-TEMPERATURE EXHAUST SENSOR

(71) Applicant: Sensata Technologies, Inc., Attleboro, MA (US)

(72) Inventors: Brendan F. Chenelle, Littleton, MA (US); Dirk J. Terryn, Ham (BE); Joseph R. Griffin, Fenton, MI (US)

(73) Assignee: Sensata Technologies, Inc., Attleboro, MA (US)

( * ) Notice: Subject to any disclaimer, the term of this patent is extended or adjusted under 35 U.S.C. 154(b) by 232 days.

(21) Appl. No.: 15/385,376

(22) Filed: Dec. 20, 2016

(65) Prior Publication Data

US 2018/0171856 A1    Jun. 21, 2018

(51) Int. Cl.
| | | |
|---|---|---|
| *G01K 1/00* | (2006.01) | |
| *G01K 7/00* | (2006.01) | |
| *G01K 13/00* | (2006.01) | |
| *F01N 11/00* | (2006.01) | |
| *G01K 7/02* | (2006.01) | |
| *G01K 13/02* | (2006.01) | |
| *G01K 1/12* | (2006.01) | |

(52) U.S. Cl.
CPC .............. *F01N 11/002* (2013.01); *G01K 1/12* (2013.01); *G01K 7/02* (2013.01); *G01K 13/02* (2013.01); *F01N 2560/06* (2013.01); *G01K 2013/024* (2013.01); *G01K 2205/04* (2013.01)

(58) Field of Classification Search
USPC ........................................ 374/208, 163, 148
See application file for complete search history.

(56) References Cited

U.S. PATENT DOCUMENTS

| 2,820,839 A | * | 1/1958 | Schunke | ................ | G01K 13/02 |
|---|---|---|---|---|---|
| | | | | | 136/231 |
| 3,691,842 A | | 9/1972 | Akeley | | |
| 4,080,027 A | | 3/1978 | Benasutti | | |
| 4,131,088 A | | 12/1978 | Reddy | | |
| 4,274,125 A | | 6/1981 | Vogel | | |
| 4,347,745 A | | 9/1982 | Singh | | |

(Continued)

FOREIGN PATENT DOCUMENTS

| CN | 103454032 A | 12/2013 |
|---|---|---|
| DE | 102004048367 A1 | 4/2006 |

(Continued)

OTHER PUBLICATIONS

Translation of FR3035500, Oct. 28, 2016.*
European Search Report for European Patent Application No. 17153203.9, dated Sep. 1, 2017, 8 pages.

*Primary Examiner* — Mirellys Jagan
(74) *Attorney, Agent, or Firm* — Burns & Levinson, LLP; Joseph M. Maraia; George N. Chaclas (57) ABSTRACT

A sensing device (100) senses a physical quantity of a fluid having a high temperature. A tube-like element (110) surrounds at least a part of a MI-cable (102) between a sensing end of the MI-cable and a sealing flange element (106) attached to the MI-cable. A major part of the inner surface of the tube-like element is at a predefined distance from the outer surface of the Mineral Insulated cable forming a gap (112) between the mineral insulated cable and the tube-like element. The tube-like element and gap increases robustness against thermal expansions and thermal shock due to rapid temperature change of the fluid.

17 Claims, 5 Drawing Sheets

(56) References Cited

U.S. PATENT DOCUMENTS

| | | | |
|---|---|---|---|
| 4,453,835 | A * | 6/1984 | Clawson .................. G01K 7/22 374/185 |
| 4,499,330 | A * | 2/1985 | Pustell ..................... G01K 7/02 136/230 |
| 4,716,492 | A | 12/1987 | Charboneau et al. |
| 4,875,135 | A | 10/1989 | Bishop et al. |
| 4,955,380 | A | 9/1990 | Edell |
| 4,984,461 | A | 1/1991 | Haynes |
| 5,000,048 | A | 3/1991 | Kordts |
| 5,189,591 | A | 2/1993 | Bernot |
| 5,193,912 | A | 3/1993 | Saunders |
| 5,231,301 | A | 7/1993 | Peterson et al. |
| 5,259,248 | A | 11/1993 | Ugai et al. |
| 5,308,249 | A | 5/1994 | Renn et al. |
| 5,388,997 | A | 2/1995 | Grange et al. |
| 5,388,998 | A | 2/1995 | Grange et al. |
| 5,427,553 | A | 6/1995 | Tsuji |
| 5,443,394 | A | 8/1995 | Billman et al. |
| 5,625,151 | A | 4/1997 | Yamaguchi |
| 5,676,559 | A | 10/1997 | Laub et al. |
| 5,800,186 | A | 9/1998 | Ramirez et al. |
| 5,974,893 | A | 11/1999 | Balcarek et al. |
| 6,003,379 | A | 12/1999 | Ichikawa et al. |
| 6,050,862 | A | 4/2000 | Ishii |
| 6,182,644 | B1 | 2/2001 | Kotwicki et al. |
| 6,313,523 | B1 | 11/2001 | Morris et al. |
| 6,341,962 | B1 | 1/2002 | Sinclair |
| 6,363,922 | B1 | 4/2002 | Romzek et al. |
| 6,412,977 | B1 | 7/2002 | Black et al. |
| 6,418,793 | B1 | 7/2002 | Pechoux et al. |
| 6,473,711 | B1 | 10/2002 | Sittler et al. |
| 6,543,934 | B1 * | 4/2003 | Hammer .................. G01K 1/18 136/230 |
| 6,625,029 | B2 | 9/2003 | Bernini |
| 6,639,505 | B2 | 10/2003 | Murata et al. |
| 6,666,691 | B2 | 12/2003 | Ikeya |
| 6,701,790 | B2 | 3/2004 | Fortner et al. |
| 6,746,150 | B2 | 6/2004 | Wienand et al. |
| 6,776,668 | B1 | 8/2004 | Scyoc et al. |
| 6,790,065 | B2 | 9/2004 | Fukunaga |
| 6,829,820 | B2 | 12/2004 | Adachi et al. |
| 6,848,928 | B2 | 2/2005 | Ikeya et al. |
| 6,857,776 | B2 * | 2/2005 | Park ........................ G01K 7/02 136/230 |
| 6,952,042 | B2 | 10/2005 | Stratton et al. |
| 7,000,478 | B1 | 2/2006 | Zwollo et al. |
| 7,073,375 | B2 | 7/2006 | Parker et al. |
| 7,077,008 | B2 | 7/2006 | Pham et al. |
| 7,197,936 | B2 | 4/2007 | Baba |
| 7,270,011 | B2 | 9/2007 | Vossenberg |
| 7,288,005 | B2 | 10/2007 | Nagahashi |
| 7,316,164 | B2 | 1/2008 | Toyoda et al. |
| 7,434,470 | B2 | 10/2008 | Engelhardt et al. |
| 7,464,604 | B2 | 12/2008 | Takeuchi et al. |
| 7,467,891 | B2 | 12/2008 | Gennissen et al. |
| 7,507,024 | B2 | 3/2009 | Takahashi |
| 7,513,806 | B2 | 4/2009 | Noda et al. |
| 7,568,835 | B2 | 8/2009 | Pils et al. |
| 7,578,194 | B1 | 8/2009 | Hadjiloucas et al. |
| 7,591,186 | B1 | 9/2009 | Boyer |
| 7,597,668 | B2 | 10/2009 | Yarden |
| 7,628,078 | B2 | 12/2009 | Matsui et al. |
| 7,651,366 | B2 | 1/2010 | Ringler et al. |
| 7,666,000 | B1 | 2/2010 | Hsiao et al. |
| 7,666,016 | B2 | 2/2010 | Kobayashi |
| 7,695,285 | B2 | 4/2010 | Sugiura et al. |
| 7,743,662 | B2 | 6/2010 | Kurtz |
| 7,762,140 | B2 | 7/2010 | Girroir et al. |
| 7,887,355 | B2 | 2/2011 | Watanabe |
| 7,938,783 | B2 | 5/2011 | Fraden |
| 7,946,855 | B2 | 5/2011 | Osato |
| 7,976,326 | B2 | 7/2011 | Stoner |
| 7,992,445 | B2 | 8/2011 | Kobayashi et al. |
| 8,038,345 | B2 | 10/2011 | Stoll et al. |
| 8,069,729 | B2 | 12/2011 | Dannhauer et al. |
| 8,109,250 | B2 | 2/2012 | Ramond et al. |
| 8,132,464 | B2 | 3/2012 | Broden et al. |
| 8,161,820 | B2 | 4/2012 | Yoneda et al. |
| 8,171,800 | B1 | 5/2012 | Chiou |
| 8,192,078 | B2 | 6/2012 | Gebauer et al. |
| 8,215,176 | B2 | 7/2012 | Ding et al. |
| 8,234,927 | B2 | 8/2012 | Schulte et al. |
| 8,263,879 | B2 | 9/2012 | Hougham et al. |
| 8,328,419 | B2 | 12/2012 | Wienand et al. |
| 8,373,430 | B1 | 2/2013 | Sochor |
| 8,385,080 | B2 | 2/2013 | Kim et al. |
| 8,388,365 | B2 | 3/2013 | Takahashi et al. |
| 8,474,322 | B1 | 7/2013 | Shapiro |
| 8,505,386 | B2 | 8/2013 | Colombo et al. |
| 8,523,432 | B2 | 9/2013 | Mujumdar et al. |
| 8,535,079 | B2 | 9/2013 | Wang et al. |
| 8,545,240 | B2 | 10/2013 | Casher et al. |
| 8,556,638 | B2 | 10/2013 | Tsubaki et al. |
| 8,671,765 | B2 | 3/2014 | Tokuda et al. |
| 8,734,190 | B2 | 5/2014 | Schlitzkus et al. |
| 8,758,067 | B2 | 6/2014 | Rathburn |
| 8,764,464 | B2 | 7/2014 | Buck et al. |
| 8,887,580 | B2 | 11/2014 | Nishikawa et al. |
| 8,893,562 | B2 | 11/2014 | Barraco et al. |
| 8,919,656 | B2 | 12/2014 | Eckerdt |
| 2002/0029639 | A1 | 3/2002 | Wagner et al. |
| 2002/0071475 | A1 | 6/2002 | Betzner et al. |
| 2002/0189334 | A1 | 12/2002 | Ford et al. |
| 2003/0109163 | A1 | 6/2003 | Shimada |
| 2004/0020300 | A1 | 2/2004 | Boehler et al. |
| 2004/0182145 | A1 | 9/2004 | Okazaki et al. |
| 2005/0061063 | A1 | 3/2005 | Haussner et al. |
| 2005/0150301 | A1 | 7/2005 | Skinner et al. |
| 2005/0233614 | A1 | 10/2005 | Gattuso et al. |
| 2006/0053875 | A1 | 3/2006 | Haussner et al. |
| 2006/0090566 | A1 | 5/2006 | Oda |
| 2006/0214202 | A1 | 9/2006 | Zorich et al. |
| 2006/0218997 | A1 | 10/2006 | Yamada et al. |
| 2006/0278012 | A1 | 12/2006 | Fujimoto et al. |
| 2007/0071065 | A1 | 3/2007 | Pils et al. |
| 2007/0110124 | A1 | 5/2007 | Shiraki et al. |
| 2007/0113660 | A1 | 5/2007 | Matsui |
| 2007/0148788 | A1 | 6/2007 | Hsieh et al. |
| 2007/0193362 | A1 | 8/2007 | Ferguson |
| 2007/0203650 | A1 | 8/2007 | Jensen et al. |
| 2007/0237205 | A1 | 10/2007 | Hayashi |
| 2008/0053237 | A1 | 3/2008 | Matsui et al. |
| 2008/0083283 | A1 | 4/2008 | Takeuchi et al. |
| 2008/0112462 | A1 | 5/2008 | Sisk et al. |
| 2008/0149079 | A1 | 6/2008 | Jefford et al. |
| 2008/0216786 | A1 | 9/2008 | Ramond et al. |
| 2008/0219319 | A1 | 9/2008 | Buckalew |
| 2009/0008092 | A1 | 1/2009 | Haeberle et al. |
| 2009/0080492 | A1 | 3/2009 | Takeuchi |
| 2009/0095059 | A1 | 4/2009 | Matsui et al. |
| 2009/0194831 | A1 | 8/2009 | Casey et al. |
| 2009/0320576 | A1 | 12/2009 | Borgers et al. |
| 2010/0002745 | A1 | 1/2010 | Stoll et al. |
| 2010/0147822 | A1 | 6/2010 | Burrows et al. |
| 2011/0019373 | A1 | 1/2011 | Ryhanen et al. |
| 2011/0019714 | A1 | 1/2011 | Perry |
| 2011/0032971 | A1 * | 2/2011 | Reiter ..................... G01K 1/12 374/208 |
| 2011/0101844 | A1 | 5/2011 | Glaser et al. |
| 2011/0201221 | A1 | 8/2011 | Kobayashi |
| 2011/0222583 | A1 * | 9/2011 | Boghun .................. B23K 26/22 374/208 |
| 2011/0290539 | A1 | 12/2011 | Willner et al. |
| 2012/0006119 | A1 | 1/2012 | Broden et al. |
| 2013/0004116 | A1 | 1/2013 | Ruggiero et al. |
| 2013/0201230 | A1 | 8/2013 | Sugahara et al. |
| 2013/0264664 | A1 | 10/2013 | Nimura et al. |
| 2013/0317388 | A1 | 11/2013 | Bieberich et al. |
| 2014/0060015 | A1 | 3/2014 | Yan et al. |
| 2014/0165735 | A1 | 6/2014 | Kurtz et al. |
| 2014/0216173 | A1 | 8/2014 | Chana |
| 2014/0260648 | A1 | 9/2014 | Aoyama et al. |
| 2014/0324323 | A1 | 10/2014 | Gates et al. |
| 2014/0341255 | A1 | 11/2014 | Kaiser et al. |

(56) References Cited

U.S. PATENT DOCUMENTS

| | | |
|---|---|---|
| 2014/0345374 A1 | 11/2014 | Morselli et al. |
| 2015/0045971 A1 | 2/2015 | Endel et al. |
| 2015/0072543 A1 | 3/2015 | Willner et al. |
| 2015/0192478 A1 | 7/2015 | Rueth et al. |
| 2015/0204733 A1 | 7/2015 | Newell et al. |
| 2016/0195415 A1 | 7/2016 | Lull |

FOREIGN PATENT DOCUMENTS

| | | |
|---|---|---|
| EP | 350612 A2 | 1/1990 |
| EP | 893676 A2 | 1/1999 |
| EP | 1074827 A2 | 2/2001 |
| EP | 2138819 A1 | 12/2009 |
| FR | 3035500 | 10/2016 |
| GB | 1461574 | 1/1977 |
| JP | 2001093634 A | 4/2001 |
| JP | 2002014113 A | 1/2002 |
| JP | 2002170617 A | 6/2002 |
| JP | 2003100375 A | 4/2003 |
| JP | 2010153321 A | 7/2010 |
| JP | 2010256187 A | 11/2010 |
| JP | 4854612 B2 | 1/2012 |
| WO | WO-9508758 A1 | 3/1995 |
| WO | WO-2004066194 A1 | 8/2004 |
| WO | WO-2005052535 A1 | 6/2005 |
| WO | WO-2006102460 A1 | 9/2006 |
| WO | WO-2011094753 A2 | 8/2011 |
| WO | WO-2014042264 A1 | 3/2014 |

\* cited by examiner

HIGH-TEMPERATURE EXHAUST SENSOR

TECHNICAL FIELD

The subject disclosure relates to a sensing device for sensing a physical quantity of a fluid having a high temperature and a method for assembling such a sensing device. More particular the subject disclosure relates to high-temperature exhaust sensors. More specifically, this disclosure relates to a high temperature capable thermocouple.

BACKGROUND ART

Internal combustion engines such as, but not limited to, diesel and gasoline engines, may include one or more temperature sensors at least partially disposed within the exhaust gas system. These temperature sensors may sense the temperature of the exhaust gas and may be used, at least in part, by an engine control system to adjust one or more properties of the engine such as, but not limited to, air/fuel ratio, boost pressure, timing or the like. Because of the operating environment, the temperature sensors may be exposed to relatively harsh conditions including, but not limited to, vibration, exposure to debris, moisture and corrosive chemicals, large temperature ranges, large temperature gradients, and relatively high continuous use operating temperatures. WO2011094753A2 discloses an exhaust gas temperature sensor comprising a temperature sensor coupled to an end of a mineral insulated cable. The cable is coupled to a stop flange. Furthermore, an anti-vibration sleeve is positioned between the stop flange and the temperature sensor.

Conventional thermocouple devices are difficult to implement in an automotive-style system. These thermocouples are typically unable to operate for the extended life requirement in an automotive setting. This situation is compounded by the increasingly harsh application requirements, which can induce failure of conventional thermocouples. These failures are more likely in sensors with a long probe length or extended high-temperature operation with rapid temperature fluctuation of the fluid in which the probe is positioned.

Upon application of heat to the environment of a conventional sensing device comprising a mineral insulated cable, the outer jacket experiences a rapid temperature increase, while conductors of the mineral insulated cable remain cool. The packed MgO in a mineral insulated cable has namely a very poor thermal conductivity. This leads to tensile stresses on the conductors, which can lead to failure, especially during thermal shock.

These failings of conventional thermocouples create the need for a design solution that enables the use of thermocouples in automotive applications, specifically those requiring long probe length.

SUMMARY OF INVENTION

It is an object of the present technology to provide an improved sensing device for measuring a physical quantity of a fluid which is at least one of: reliable, cheaper to manufacture, producible in high volume by means of semi- or full automatic production processes, long lasting and/or robust to harsh media, increased robustness against thermal expansions and thermal shock, withstanding the temperature and vibration typical of automotive applications.

According to a first aspect of the subject technology, this object is achieved by a measuring plug having the features of claim 1. Advantageous embodiments and further ways of carrying out the present technology may be attained by the measures mentioned in the dependent claims.

A sensing device according to the present technology is characterized in that the sensing device comprises a tube-like element surrounding at least a part of a Mineral Insulated cable between a sensing end of the Mineral Insulated cable and a sealing flange element coupled to an outer metallic jacket of the mineral insulated cable. A major part of the inner surface the tube-like element is at a predefined distance from the outer surface of the Mineral Insulated cable and forms a gap between the mineral insulated cable and the tube-like element.

These features decrease the degree of thermal shock in the mineral insulated cable. The tube-like element and the gap function as a thermal isolator between the fluid and the outer metallic jacket of the mineral insulated cable resulting in less rapid temperature change of the outer jacket of the mineral insulated cable. As a result the maximum temperature difference between the outer jacket of the mineral insulated cable and the conductors in the mineral insulated cable will decrease. A smaller maximum temperature difference means less tensile stress on the conductors.

In an embodiment, the gap between the outer jacket and tube-like element is filled with a material with poor thermal conductivity, such as any mineral insulation material. In an advantageous embodiment, the gap is filled with air such that convective transfer is minimized through the specification of the gap size.

In a further embodiment, a proximal end of the tube-like element is attached to the sealing flange element. In an alternative embodiment, the tube-like element is welded to the sealing flange element. In these ways, the tube-like element is affixed in axial direction of the mineral insulated cable; as a result the thermal contact surface between the tube-like element and the mineral insulated cable could be minimized to the surface needed to align the mineral insulted cable in the tube-like element.

In an embodiment, the tube-like element comprises at least one radially crimped region to align the mineral-insulated-cable in the tube-like element. These features provide an easy method of assembly to position and align the tube-like element around the mineral insulated cable. Furthermore, by these features, stress in the combination of sealing flange element and tube-like element due to vibrations perpendicular on the body axis of the mineral insulated cable is reduced, which increases the product life time.

In a further embodiment, a radially crimped region of the tube-like element is located at a distal end section of the tube-like element. This feature aligns the mineral insulated cable in the tube-like element. As a result the thermal resistance of combination of the tube-like element and gap is substantially equal around the body axis of the mineral insulated cable and the sensing device is consequently independent of the angular direction of the heat source perpendicular to the body axis of the mineral insulated cable.

In a further embodiment, a radially crimped region comprises three or more dimples located at equal distance from each other. In this way, the thermal conductivity between tube-like element and mineral insulated cable could be minimal.

In an alternative embodiment, the sealing flange element comprises a ring section and a tube section, the tube-like element is attached to a distal end the tube section. This feature reduces wear in the coupling between the tube around the mineral insulated cable and the sealing ring. It has been found that welding a tube-like element directly to the sealing ring forms a construction which is less robust than a sealing flange element out of one piece of material with ring section and tube section. Wear in the combination of sealing flange element and tube-like element could be reduced further by at least one radially crimped region at the tube section of the sealing flange. Advantageously, a radially crimped region of the tube section is located at a distal end section of the tube section.

In an embodiment, the sensing element is configured to sense temperature. However, the sensing element might also be a pressure sensing element, oxygen sensor (or lambda sensor), or any other sensor sensing one or more physical quantities of the fluid having a large operating temperature range, for example −60 to +1000° C.

In a second aspect there is provided a method of assembling a sensing device for sensing a physical quantity of a fluid having a high temperature. The method comprises:

providing a component comprising a mineral insulated cable with an outer metallic jacket, conductors disposed in the outer metallic jacket and Magnesium Oxide insulation and a sensing element configured for sensing the physical quantity and coupled to a sensing end of the Mineral Insulated cable;

providing a sealing flange element;

attaching the sealing flange element to the mineral insulated cable, providing a tube-like element;

positioning at least a part of the mineral insulated cable between the sealing flange element and the sensing element in the tube-like element such that a major part of the inner surface the tube-like element is at a predefined distance from the outer surface of the Mineral Insulated cable forming a gap between mineral insulated cable and the tube-like element.

In a further embodiment, the method further comprises attaching a proximal end of the tube-like element to the sealing flange element.

In a further embodiment, the method further comprises radially crimping the tube-like element to align the mineral-insulated cable in the tube-like element.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DESCRIPTION OF EMBODIMENTS

The advantages, and other features of the technology disclosed herein, will become more readily apparent to those having ordinary skill in the art from the following detailed description of certain preferred embodiments taken in conjunction with the drawings which set forth representative embodiments of the present technology.

Figure 1:
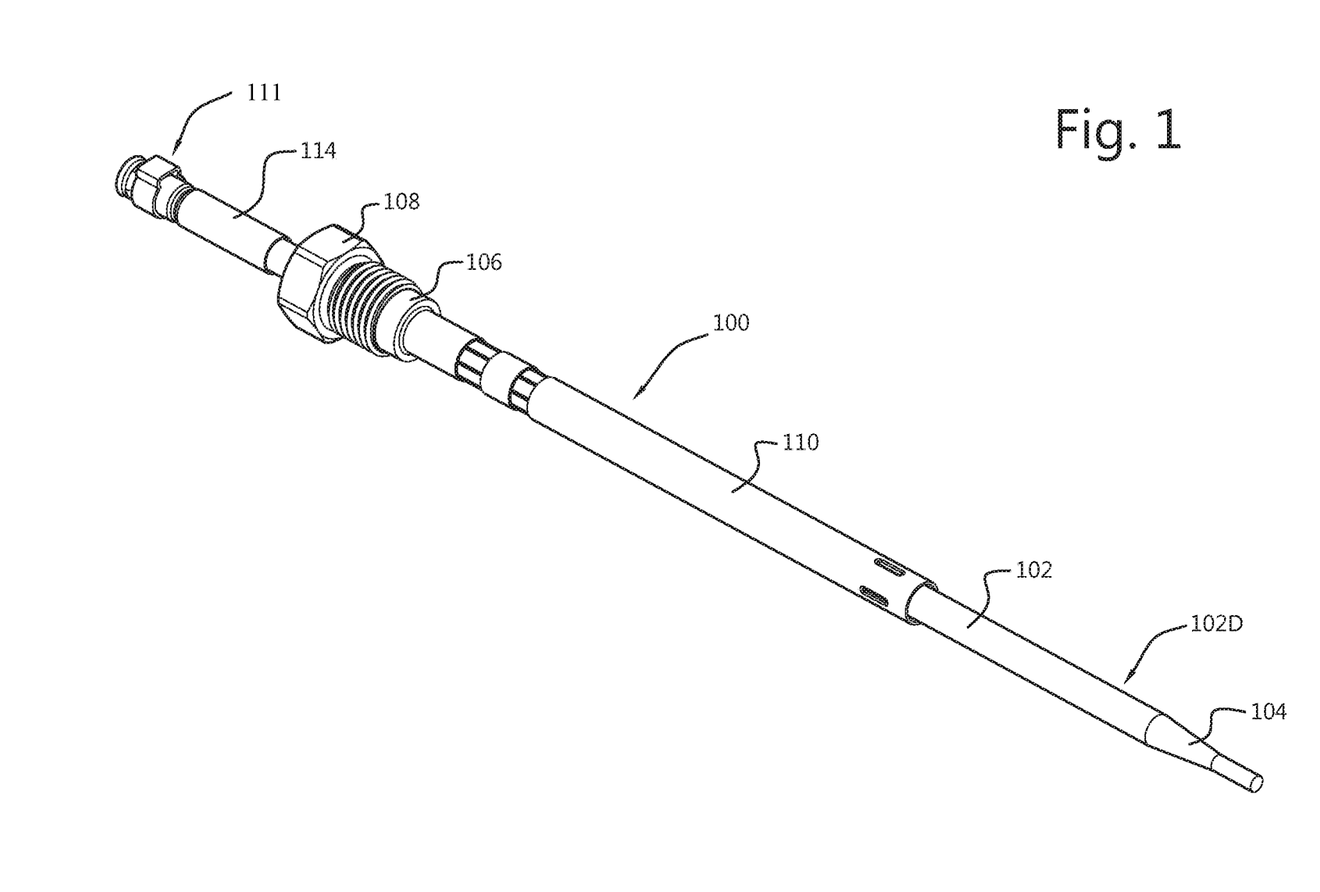
FIG. 1 shows schematically a perspective view of a first embodiment of a temperature sensor.

FIG. 1 shows a perspective view of a first embodiment of a temperature sensor 100 according to the present application. The sensor 100 is suitable for sensing temperature of a fluid having a high temperature. High temperature in the context of the present application means that the sensor is suitable to be used to measure the physical quantity temperature of a fluid in a temperature range from −60° C. up to more than 1000° C. The shown sensor is particularly designed for measuring the temperature of a flow of exhaust gas in a diesel after treatment system. The sensor is able to survive in automotive and heavy vehicle applications. Furthermore, the sensor has improved characteristics with respect to thermal shocks experienced in diesel after treatment systems.

Figure 4:
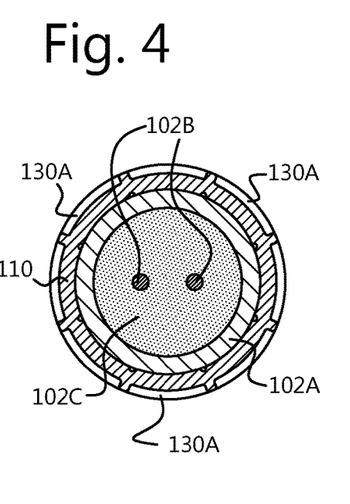
FIG. 4 shows schematically a cross sectional view of a first embodiment of a crimped region.
Figure 5:
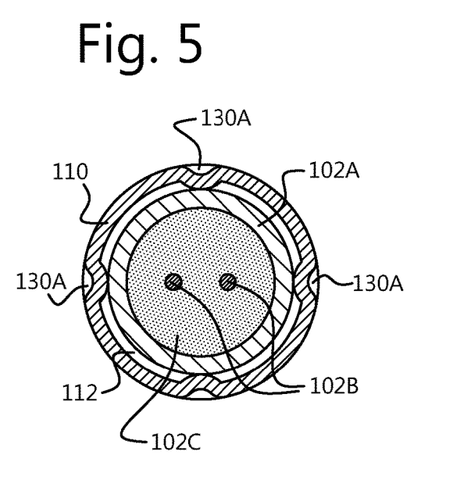
FIG. 5 shows schematically a cross sectional view of a second embodiment of a crimped region.
Figure 6:
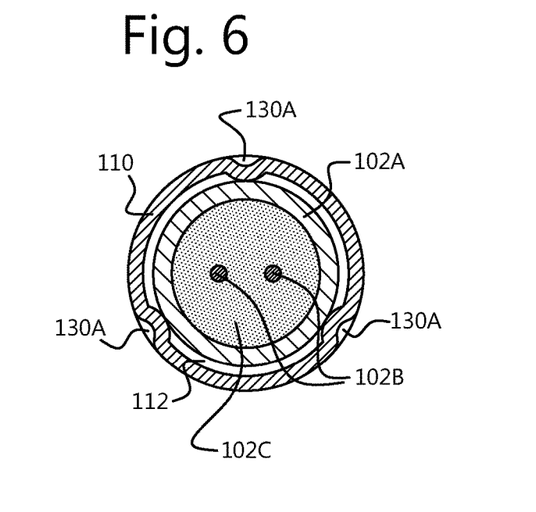
FIG. 6 shows schematically a cross sectional view of an alternative embodiment of a crimped region.

The sensor 100 consists of a known MI-cable (Mineral Insulated cable) 102 with a sensing element 104 coupled to a sensing end 102D of the MI-cable. FIGS. 4-6 show a cross section of the MI-cable. The MI-cable comprises an outer metallic jacket 102A, two or more conductors 102B disposed in the outer metallic jacket 102A and Magnesium Oxide insulation 102C. The length of the MI-cable depends on the application requirement. The outer metallic jacket could be an Inconel sheath or any other metal, e.g. stainless steel or copper, depending on the application requirement.

The sensor 100 further comprises a sealing flange element 106. The sealing flange element is used in conjunction with the mounting nut 108, to secure the sensor in the application. The sealing flange element 106 could be a ring-shaped element which is attached to the outer metallic jacket of the MI-cable for example by welding. The ring-shaped weld forms a hermetic sealing between the MI-cable and the ring-shaped element. By screwing the mounting nut in an opening of a device though which the sensing element is positioned in a cavity of the device to sense the temperature in the fluid, the sealing flange element is pressed to a sealing surface of the opening to seal, preferably hermetically, the opening of the device with the sensor.

The sensor 100 further comprises a tube-like element 110. The tube-like element could be an extruded part obtained by an extrusion process. The tube-like element is located externally to the outer metallic jacket and surrounds at least a part of the MI-cable 102 between the sealing flange element 106 and the sensing end 102D of the MI-cable. The tube-like element could be constructed of any suitable alloy, for example Inconel, stainless steel or copper. The tube-like element has an inner diameter such that it fits over the outer metallic jacket leaving a space between outer surface of the MI-cable and the inner surface of the tube-like element. A proximal end 110A of the tube-like element 110 is attached to the sealing flange element 106, for example by laser welding.

The tube-like element 110 is radially crimped such that the crimps align the axis of the tube-like element 110 and the MI-cable 102. In this way, a major part of the inner surface the tube-like element is at a predefined distance from the outer surface of the MI-cable. This distance forms a gap between the MI-cable and the tube-like element. In use, the gap is filled with the fluid which temperature is measured. In a more expensive embodiment the gap might be filled with any suitable flexible thermal insulating material that resists the high temperature of the fluid to be measured. Said distance is preferably chosen such that the combination of heat transfer by 1) conduction through the fluid in the gap, 2) the radiation across the air gap from the tube-like element to the MI-cable is optimal with respect to the diameter of the tube-like element. The distance should be small enough to prevent convection and large enough to reduce sufficiently the radiation across the gap.

The sensor 100 further comprises a rear housing 114 which transitions the electrical signal from the MI-cable to flexible harness 111. The present application will focus on the interaction between the MI-cable between the sealing flange element and the sensing element.

In an embodiment, the sensing element 104 is formed by a thermocouple junction (type-N) (not shown). The thermocouple junction is obtained by welding the conductors of the MI-cable. In this embodiment the sensor has the function of outputting an electrical voltage difference in the conductors depending on the temperature of the junction. The junction is protected from the sensed fluid by a protective cap, which is welded to the outer metallic jacket of the MI-cable.

The function of the tube-like element 110 is as follows. During application of thermal energy to the environment of the sensor, heat must transfer first into the sheath assembly outer surface. The heat at the inner surface may either conduct through the medium in the gap, transfer by radiation across the gap in case of a fluid or conduct across the areas of the crimps that has mechanical contact with the outer metallic jacket of the MI-cable. This has the effect of lowering the magnitude of the thermal gradient between the outer jacket 102 and conductors of the MI-cable 102B and thus to lowering difference in thermal expansion of the outer jacket and conductors of the MI-cable. This lowers the magnitude of stress experienced by the conductors during a thermal cycle, thus improving thermal shock response of the sensor.

Figure 2:
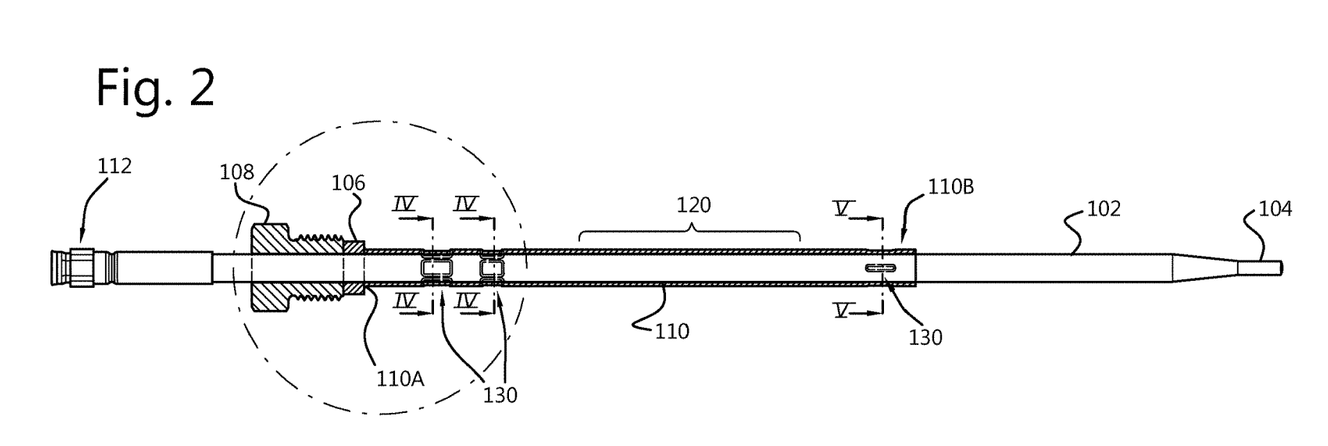
FIG. 2 shows schematically a partial cross sectional view of the first embodiment.

Experiments have shown that the temperature in a flow of exhaust gas in an exhaust system is not evenly distributed in a cross section of the flow and is highly dependent on the individual application. In the present application, the term "hot spot region" is used to indicate the regions in a flow with high temperature variations which require the improvements claimed in this document to assure a suitable service life. Furthermore, tests have indicated that it is important that the design of the tube-like element take into account the vibration characteristic of the application to prevent resonance-induced failure. By changing the relative length of the tube-like element the resonance frequency can be changed and thus the amplitude of the vibration could be reduced resulting in improved product life time. By taking into account the location of the varying heat and the vibration characteristic, the length of the tube-like element could be shorter than the length of the MI-cable between the sealing flange element and sensing-element. FIG. 2 shows schematically a partial cross sectional view of the first embodiment. In this embodiment only a part of the MI-cable between the sealing flange element 106 and the sensing element 104 is shielded by a heat shield formed by the tube-like element 110. A hotspot region with highest temperature variation in this particular application is indicated with reference numeral 120.

FIG. 2 shows further that the tube-like element 110 comprises three radially crimped regions 130. A cross sectional view of the two left sided crimped regions is given in FIG. 4 and a cross sectional view of the crimped region nearest to the sensing element is given in FIG. 5. Tests have shown that having two crimped regions at the proximal end of the protection tube around the MI-cable improves the resistance of the combination of sealing element 106 and tube-like element 110 with respect to vibrations. Preferably, radially crimped regions are not present in the hotspot region to reduce thermal transfer.

Figure 3:
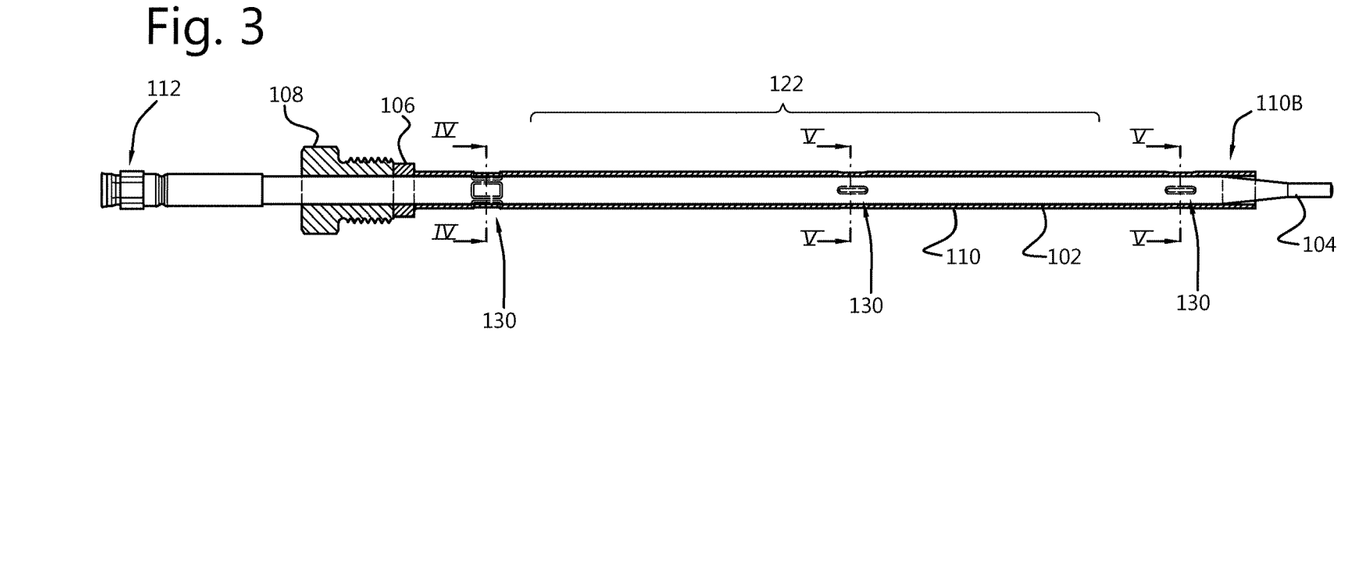
FIG. 3 shows schematically a partial cross sectional view of a second embodiment of a temperature sensor.

FIG. 3 shows schematically a partial cross sectional view of a second embodiment of a temperature sensor. This embodiment differs from the embodiment in FIG. 2 in that tube-like element 110 extends fully along the length of the MI-cable between the sealing flange element and the sensing element. This is necessary when the hot-spot region 122 is not limited to a relative small part at the length of the MI-cable in contact with the fluid. Furthermore, when the length of the MI-cable inserted in a fluid to be sensed is long and the hotspot region is wide, it might be necessary to have one or more crimped regions between the one or two crimps located at the sealing element side and the crimp located at the sensing element side. For example, when the speed of the flow perpendicular to the axis of MI-cable is high and no crimps are used in between, tube-like element could be deformed by the flow such that the gap width is not the same at all places. Consequently, the heat transfer characteristic from the fluid through the tube-like element and the gap to the MI-cable is not equal around the MI-cable and the MI-cable is heated at one side faster than the opposite side and will bend due to differing thermal expansion. The additional crimped regions improve the alignment of the central axis of the tube-like element 110 and the central axis of the MI-cable 102. This results in a predefined constant gap width between the tube-like element and the MI-cable of the non-crimped regions and consequently to a thermal sensitivity of the sensing device which is independent of the angular direction of a heat source perpendicular to the body axis of the MI-cable.

FIG. 4 shows schematically a cross sectional view of a first embodiment of a crimped region. In the outer metallic jacket 102A are located two conductors 102B in an insulation material 102C such as, but not limited to, Magnesium Oxide. The crimped region comprises eight wide dimples 130A. In this crimped region most of the inner side of the tube-like element 110 is pressed to the outer surface of the MI-cable. Furthermore, there is almost no gap. This type of crimp has the advantage that it provides strong mechanical fixation between the tube-like element and the metallic jacket, improving stiffness and vibration resistance. A disadvantage of this type of crimp is that the heat transfer from the tube-like element in these regions to the MI-cable is very good, i.e. heat resistance is very low. Therefore, this type of crimp is used at the end of the tube-like element which is coupled to the sealing flange element. In this region, being out of the hotspot region and at the root of the sensor, mechanical fixation is the most important characteristic.

FIG. 5 shows schematically a cross sectional view of a second embodiment of a crimped region. This embodiment differs from the previous one in that the crimped region comprises four narrow dimples 130A. In this crimped region a small part of the inner side of the tube-like element 110 is pressed to the outer surface of the MI-cable. Furthermore, the space between the tube-like element 110 and the jacket 102A forms a gap. This type of crimp has the advantage that the heat transfer from the tube-like element in this region to the MI-cable is much less than the crimped region shown in FIG. 4, i.e. heat resistance is high. A disadvantage of this type of crimped region is that it provides less mechanical stiffness, and less resistance to relative vibrations of the tube-like element at one side of the crimped region to the outer side of the crimped region. Therefore, this type of crimp is used at a distal end section 110B of the tube-like element and if necessary in a hot spot region. FIG. 6 shows schematically a cross sectional view of an alternative embodiment of a crimped region with three dimples. By generating three or more dimples during a radially crimp process it is easy to align the central axis of both the MI-cable and tube-like element. Preferably, the three or more dimples of the radially crimped regions are located at equal distance from each other.

Figure 7:
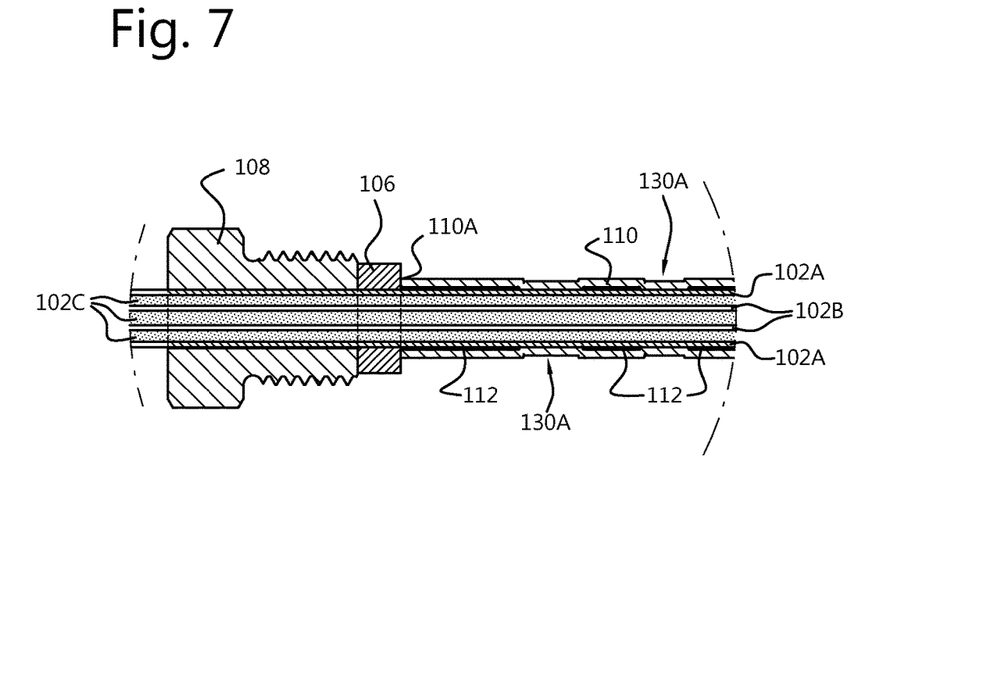
FIG. 7 shows schematically in detail a cross sectional view of the first embodiment in FIG. 2.

FIG. 7 shows schematically in detail a cross sectional view of the first embodiment in FIG. 2. This figure shows the coupling between the tube-like element 110 and the sealing flange element 106. In this embodiment the sealing flange element is a sealing ring which is attached to the metallic jacket 102A of the MI-cable by laser welding. An end 110A of the tube-like element is laser welded to the sealing ring. Furthermore, the depressions 130A of the two radially crimped regions can be seen. In this embodiment, the crimped regions are located at the tube-like element.

Figure 8:
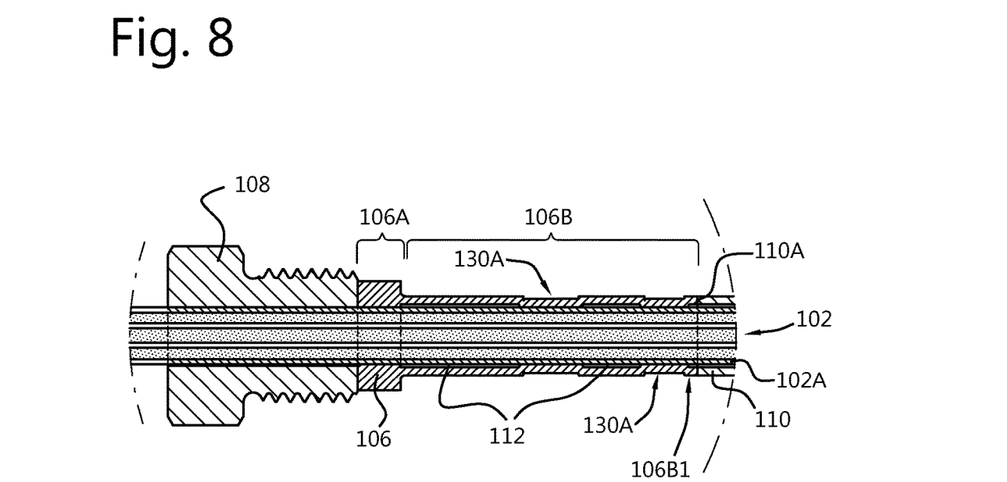
FIG. 8 shows schematically an alternative embodiment of the sealing element; and, FIG. 9 shows an embodiment of a connection between sealing element and tube-like element.

FIG. 8 shows schematically an alternative embodiment of the sealing element. In this embodiment, the sealing flange element is made from one piece of metal and comprises a ring section 106A and a tube section 106B. The end 110A of the tube-like element is attached to a distal end 106B1 of the tube section 106B. Furthermore, the tube section 106B is radially crimped at two locations. Tests have shown that in this embodiment the welded connection between sealing flange element 106 and tube-like element 110 is less sensitive to stress due to vibrations. It might further be possible that the tube section 106B comprises at its distal end one crimped region and the proximal end of the tube-like element 110 comprises a crimped region. In this embodiment the connection between sealing flange element is between said two crimped regions.

Figure 9:
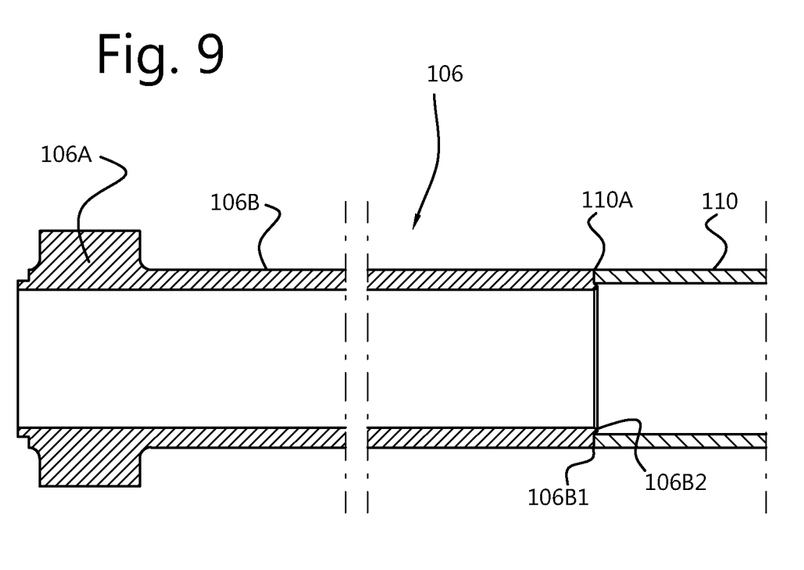

FIG. 9 shows an embodiment of a connection between sealing flange element 106 and tube-like element 110. In this embodiment the sealing flange element is one piece comprising the ring section 106A and the tube section 106B. An alignment feature 106B2 is provided at a side of the sealing flange element 106 facing the tube-like element 110. The alignment feature 106B2 is a triangular projection at the distal end 106B1 of the tube section 106B which is coaxial to the flange element 106. The triangular projection fits in the opening at the end 110A of the tube-like element 110. In the present embodiment the outer diameter of the tube section 106B and tube-like element 110 are similar. Likewise, the inner diameter of the tube 106B section is smaller than the inner diameter of the tube-like element 110. The outer diameter of the triangular projection 106B2 matches the inner diameter of the tube-like element 110. When positioning the tube-like element against the distal end 106B1 of the tube section 106B, the triangular projection aligns the central axis of the sealing element 106 and the tube-like element 110. Subsequently, by means of a circular weld the tube-like element 110 is attached to the sealing element 106.

In case the diameter of the through hole of the sealing flange element corresponds to the diameter of the MI-cable, the triangular projection 106B2 has a width which is preferably equal to the desired gap width between the MI-cable (not shown in FIG. 9) and the tube-like element 110. In this way, a radial crimp of the tube-like element near the proximal end 110A of the tube-like element 110 is not necessary.

It should be noted that if the diameter of the though hole of flange element 106 and tube-like element 110 are similar, the proximal end 110A of the tube-like element 110 comprises a circular recess to receive the triangular projection 106B2. Furthermore, a radially crimped region at a distal end of the tube section 106B aligns the central axis of the tube section and the MI-cable 102. Consequently the triangular projection 106B2 aligns the central axis of at least the proximal end part of the tube-like element 110.

The embodiments described above could be assembled with a method comprising the following actions. Providing a component comprising a mineral insulated cable with an outer metallic jacket, conductors disposed in the outer metallic jacket and Magnesium Oxide insulation. Optionally a sensing element configured for sensing the physical quantity is already coupled to a sensing end of the Mineral Insulated cable. Providing a sealing flange element. Attaching the sealing flange element to the mineral insulated cable by a circular welding process. Subsequently a tube-like element is provided. The distal end is inserted in and/or through the tube-like element such that at least a part of the mineral insulated cable between the sealing flange element and the sensing end is positioned in and surrounded by the tube-like element. The tube-like element is positioned such that a major part of the inner surface the tube-like element is at a predefined distance from the outer surface of the Mineral Insulated cable to form a gap between mineral insulated cable and the tube-like element.

By a radially crimping process, a crimped region with three or more dimples might be formed at the tube-like element. The depth of the dimples is preferably slightly more than the predefined width of the gap. In this way, the body axis of the tube-like element is aligned with the body axis of the MI cable, while the metallic jacket is minimally deformed and the tube-like element is affixed in axial direction to the MI cable by a clamping force. In this way it is possible to have an embodiment of a sensing device wherein the tube-like element is not attached at one end to the sealing flange element to avoid movement of the tube-like element in axial direction. In this embodiment, the tube-like element should comprise at least two crimped regions, i.e. at both ends, to obtain a constant gap width between the tube-like element and the MI cable in axial direction. The application of the sensing device determines whether this embodiment is suitable.

To obtain the embodiment shown in the figures, the method further comprises: attaching a proximal end of the tube-like element to the sealing flange element.

The benefits of the present application include a fundamental improvement in thermocouple performance during thermal shock, in increase in product life during thermal cycling, and lower overall conductor temperatures for a given fluid temperature. The presented application describes sensors with long probe length or extended temperature operational temperature sensing range which use an MI-cable between sealing flange element and sensing element. These sensors survive in automotive environments for long periods of time.

It should be noted that the described embodiments all comprise a high-temperature thermocouple of type-N as temperature sensing element. It might be clear that the type-N high-temperature thermocouple could be replaced by any other sensing element for sensing a physical characteristic of a fluid having a temperature rapidly varying of a large range to obtain the described advantages. Examples of other sensing elements are not limited to: other types of high-temperature thermocouples, PTC- or NTC-thermistors, and oxygen sensing elements (or lambda sensors).

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the scope of the appended claims.

The invention claimed is:

1. A sensing device for sensing a physical quantity of a fluid having a high temperature, comprising:
    a cable having an outer metallic jacket, conductors surrounded by the outer metallic jacket, and Magnesium Oxide insulation in contact with the conductors;
    a sensing element configured for sensing the physical quantity and coupled to a sensing end of the cable;
    a sealing flange element coupled to the outer metallic jacket of the cable; and
    a tube-like element, having a proximal end attached to the sealing flange element, surrounding at least a part of the cable between the sealing flange element and the sensing end of the cable, wherein the sensing element is located exterior to the tube-like element and a major part of the inner surface of the tube-like element is at a predefined distance from the outer surface of the cable forming a gap between the cable and the tube-like element.

2. The sensing device according to claim 1, wherein the gap is an air gap.

3. The sensing device according to claim 1, wherein the tube-like element is welded to the sealing flange element.

4. The sensing device according to claim 1, wherein the sensing element is configured to sense temperature.

5. The sensing device according to claim 1, wherein the tube-like element comprises at least one radially crimped region to align the cable in the tube-like element.

6. The sensing device according to claim 5, wherein the radially crimped region of the tube-like element is located at a distal end section of the tube-like element.

7. The sensing device according to claim 5, wherein the radially crimped region comprises three or more dimples located at equal distances from each other.

8. The sensing device according to claim 1, wherein the sealing flange element comprises a ring section and a tube section, wherein the tube-like element is attached to a distal end of the tube section.

9. The sensing device according to claim 8, wherein the distal end of the tube section of the sealing flange element comprises an alignment feature configured to align a body axis of the sealing flange element and a body axis of the tube-like element.

10. The sensing device according to claim 8, wherein the tube section of the sealing flange element comprises at least one radially crimped region.

11. The sensing device according to claim 10, wherein the radially crimped region of the tube section is located at a distal end section of the tube section.

12. A device for sensing a physical quantity of a fluid having a high temperature, the device comprising:
    a cable including: an outer metallic jacket; conductors surrounded by the outer metallic jacket; and insulation in contact with the conductors, wherein the cable has a sensing end;
    a sensing element configured for sensing the physical quantity and coupled to the sensing end;
    a sealing flange coupled to the outer metallic jacket of the cable; and
    a tube-like element, having a proximal end attached to the sealing flange, surrounding at least a part of the cable between the sealing flange and the sensing end for forming a gap between the cable and the tube-like element, wherein the gap is filled with the fluid for measurement and the sensing end is located exterior to the tube-like element.

13. A sensing device for sensing a physical quantity of a fluid having a high temperature, comprising:
    a cable having an outer metallic jacket, conductors surrounded by the outer metallic jacket, and Magnesium Oxide insulation in contact with the conductors;
    a sensing element configured for sensing the physical quantity and coupled to a sensing end of the cable;
    a sealing flange element coupled to the outer metallic jacket of the cable; and
    a tube-like element surrounding at least a part of the cable between the sealing flange element and the sensing end of the cable, wherein the tube-like element comprises at least one radially crimped region to align the cable in the tube-like element, and wherein the sensing element is located exterior to the tube-like element and a major part of the inner surface of the tube-like element is at a predefined distance from the outer surface of the cable forming a gap between the cable and the tube-like element.

14. The sensing device according to claim 13, wherein the gap is an air gap.

15. The sensing device according to claim 13, wherein a proximal end of the tube-like element is attached to the sealing flange element.

16. The sensing device according to claim 13, wherein the radially crimped region of the tube-like element is located at a distal end section of the tube-like element.

17. The sensing device according to claim 13, wherein the radially crimped region comprises three or more dimples located at equal distances from each other.

* * * * *